Figure 1:
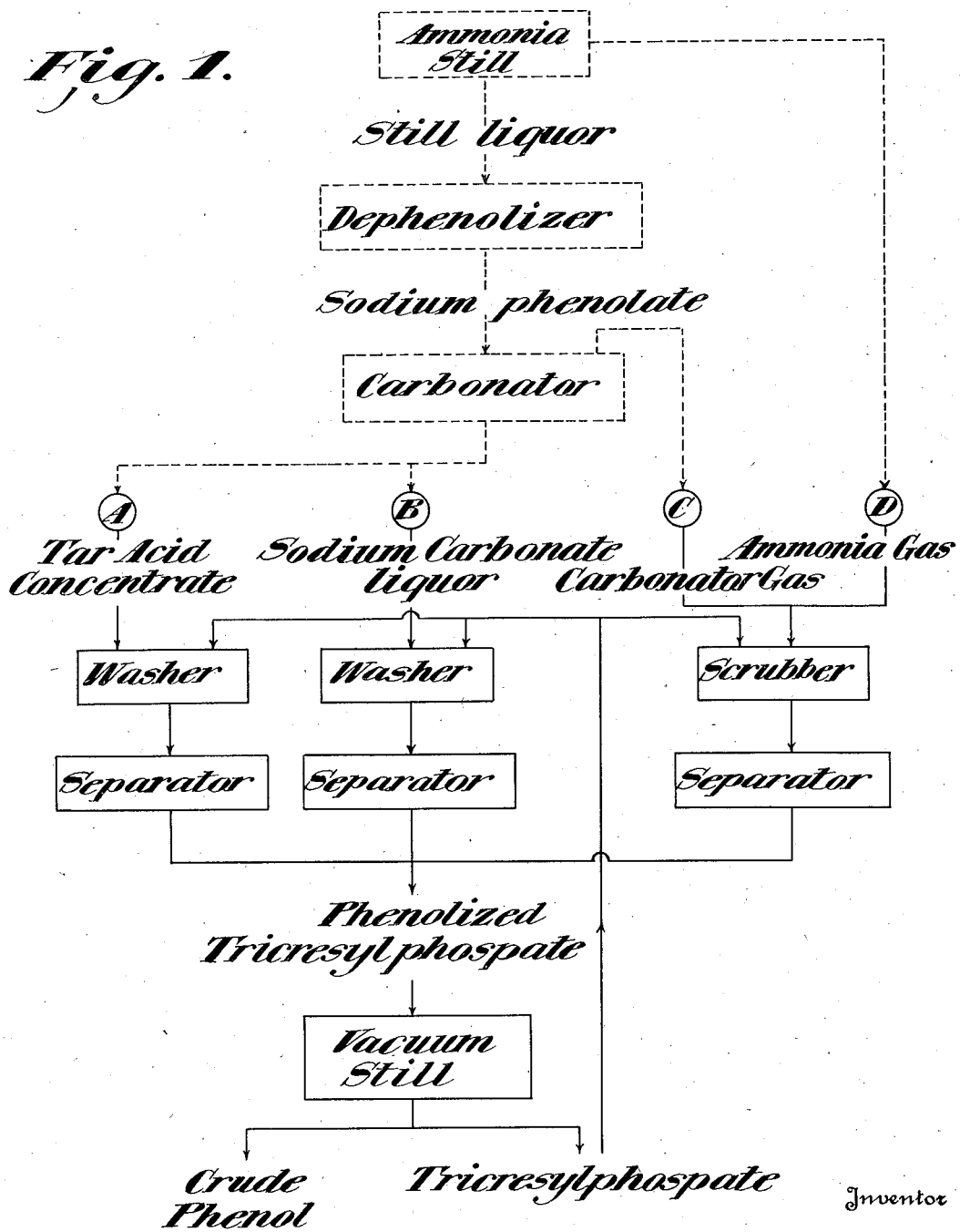

Patented Apr. 14, 1936

2,037,295

UNITED STATES PATENT OFFICE 2,037,295

PHENOL EXTRACTION

Benjamin W. Winship, Orchard Park, N. Y., assignor to Bethlehem Steel Company, a corporation of Pennsylvania Application January 4, 1934, Serial No. 705,232

6 Claims. (Cl. 260—154)

This invention relates to the recovery of tar acids contained in coal gas liquors and more specifically to the extraction of mixed mono- and di-hydric phenols therefrom. Various methods are in use for the dephenolization of gas liquor, having been devised mainly to avoid the discharge of phenolic wastes into streams, where such discharge might contaminate an adjacent water supply. These methods are for the most part intended to overcome a disposal nuisance and are in many cases a source of expense to the coke oven or gas plants using them. More recently there have been devised improved methods of treating gas liquors, which by the use of special solvents, having high affinity for phenolic compounds, permit the profitable extraction of these compounds in a condition suitable for the market. A more general use of these improved methods is delayed by the fact that their adoption for the direct treatment of gas liquor involves a complete re-equipment of existing disposal plants, many of which have but recently been installed. The necessity of maintaining a substantially large volume of an expensive solvent in circulation, in view of the comparatively meager content of phenols in the initial gas liquor, entails an initial material outlay of substantial proportions. The purpose of this invention is therefore to devise a method whereby a high grade solvent may be used to beneficiate the phenolic liquors, obtained in existing gas liquor treatment plants, whereby the advantages of the solvent in moderate volume may be realized and a more useful product obtained. A further purpose of the invention is to recover to a substantial degree losses in phenol, which are incidental to the operation of existing treatment plants.

A particularly desirable solvent is that which consists of a mixture of liquid phosphatic esters, of the triaryl phosphate type and principally tricresyl phosphate. This solvent has proved to be very effective in the direct treatment of gas liquors, as fully disclosed in U. S. Patent 1,826,369. In the contemplated method of improving dephenolizing processes, utilizing other methods, it is intended to use tricresyl phosphate for the treatment and refinement of the various phenolic residues produced.

A typical dephenolizing process of established use, is that which involves circulating hot ammonia still liquor into countercurrent contact with tower vapors in the upper section of a scrubbing tower, thereby removing phenol constituents in vapor phase, said phenols then circulating through the lower sections of the tower in series, there to be converted to sodium phenolate by contact with alkaline solutions, concentration being built up to the desired degree by recycling the solution from one to the other compartment. The dephenolized liquor is returned to the lime leg of the ammonia still. The phenolate solution is sprung in the usual manner with $CO_2$, and the carbonated liquids resulting therefrom are allowed to separate into two layers, (as for example a liquor containing 40-50% of tar acids, floating on a fairly concentrated solution of sodium carbonate and bicarbonate), the latter still retaining some residual tar acids in solution. The respective positions of the two layers on separation will however depend on their individual concentrations. Practice has nevertheless shown that a clean separation of tar acids and alkali solution is never obtained and that the former are therefore not readily amenable to further refining treatment leading to a product of commercial grade. It has also been suggested that the alkaline solutions be causticized and recycled to the phenol absorption tower and added to the caustic solution flowing therethrough. However, the fact that these recycled solutions entrain tar acid impurities back into the system is not a desirable characteristic. It is also found in plant practice that an appreciable loss of phenol is incurred in the vapors arising from the carbonating tower and which are usually vented, with or without washing, to the atmosphere.

These several difficulties are the reason that the dephenolizing of ammonia still liquors by a process such as that described, while effecting the removal of phenols to the extent desired for the removal of nuisance, yet fail to recover the phenols in such a manner as to render their recovery economically attractive.

The present improvement contemplates the treatment of each separated layer of liquor resulting from carbonization, with tricresylphosphate, such treatment being effected in a packed tower, or by the mechanical mixing effect of a rotary pump discharging both liquids into a separating tank, or again by making the addition of solvent in an agitating tank, all of which methods of effecting intimate mixing between liquids are well known and in common use. The mixed liquids are allowed to separate and in this manner there is obtained separation of a substantially clean solution of phenolic tricresylphosphate from the dilute carbonate solution. Similarly by bubbling the vapors from the carbonator through tricresylphosphate solution, a further recovery of the original phenol is obtainable from this source. The combined solutions of phenolic tricresylphosphate, viz, that derived from each layer of carbonating tower liquor and that from the absorption of carbonating tower waste gas, may then be treated by vacuum distillation in the known manner, the contained phenols being distilled from the tricresylphosphate and recovered by condensation as a crude phenol of marketable grade; the tricresylphosphate being recycled through the system.

The purpose of the present improvement being, not merely the removal of phenols from gas plant waste liquors but an economic recovery of the maximum percentage of the original phenols in the ammonia liquor, a further recovery is to be sought by treating the ammonia gas, released from the ammonia liquor in the free section of the ammonia still. As much as 30% of the phenol originally present in the weak ammonia liquor, is normally carried off by the still gas. Therefore, even though a highly effective method of treating ammonia-still waste liquors be followed, so as to obtain therefrom a 90% removal of phenol, the overall recovery is but 60–65% of the original phenol available from the coolers, due to the aforesaid loss in the still gas.

Obviously in the case of a new by-product installation this condition may be adequately met by the methods disclosed in the previously referred to U. S. Patent 1,826,369, since by this method the crude ammonia liquor with all the phenol it contains is treated in a single phase ahead of the ammonia still. However, in the case of plants already existing, particularly those that have been compelled by local conditions, to install some form of dephenolizing equipment for treating the waste liquor from the ammonia still, the process steps of the above patent cannot be applied without considerable change of equipment and corresponding expense. Also the treatment of comparatively large volumes of dilute liquors containing small amounts, 1 to 3 grams of phenol per litre, necessitates maintaining correspondingly large volumes of expensive solvent in circulation.

In the present improvement, it is sought to offset these disadvantages by utilizing the solvent to remove the phenolic constituents present in the liquor in more concentrated form, as is the case in the tar acid layer that separates from a carbonated solution of alkaline phenolate, when this method of dephenolizing still wastes is used. This tar acid layer which separates from the alkaline carbonate solution, despite its concentration of phenols and cresols, is not a suitable product for further refining, by the usual methods, because it contains a quantity of emulsion formed between the alkali solution and certain tar acid impurities. By treating it with a water insoluble solvent such as tricresylphosphate, this emulsion and the emulsifying agents are dropped out of the phenolized tricresylphosphate and a substantially clean separation of the latter may be made; subsequent separation of the crude phenol from the solvent being effected by vacuum distillation in the well known manner. Thus a very substantial part of the phenols available may be recovered with a very much smaller volume of the solvent.

The alkaline carbonate solution from which the above-mentioned tar acid layer separates, also contains residual amounts of phenolic products which in the same way may be recovered by washing with tricresylphosphate. By continually recycling the solvent into intimate contact with the solution until a suitable concentration of tar acids is built up in the solvent, say for example 100–125 grams per litre, further quantities of phenols may be recovered.

In the case of the phenols entrained with the carbonation gas leaving the carbonator and which is normally vented to the atmosphere, they may also be recovered in substantial degree by scrubbing them with tricresylphosphate. Similarly the ammonia gas from the still may be scrubbed with this solvent and the phenol normally lost in the gas may be recovered.

The accompanying flow sheet illustrates one proposed method of treatment. The dotted flow lines indicate the normal process steps of dephenolizing ammonia still liquor, prior to the treatment above described; the steps of the present improvement are shown by undotted flow lines. From this it can be seen that four products are susceptible to treatment with tricresylphosphate, and are enumerated as follows:

A. Tar acid separation from alkaline carbonate solution, containing approximately 50% of mixed phenols and cresols.

B. Alkaline solution containing residual phenols amounting to, for example, 15–18 grams per litre.

C. Carbonator exhaust gas containing entrained phenols in varying proportions.

D. Ammonia still exhaust gas with, for example, .4–.6 gram of phenols per cubic meter, principally as ammonium phenolate.

In the flow sheet, treatment of A and B are shown separately, but C and D are for the sake of simplicity, shown combined for scrubbing. In practice there would be no purpose in diluting the ammonia gas (D) with the mixed gases (C) for carbonation. Separate scrubbers would therefore be used for each gas, but the solvent might conveniently be recycled from one to the other until a suitable concentration of phenol had been built up in the solvent. Obviously phenolized solvent from B, C or D can be circulated to A for absorption of further phenol if desired.

As previously indicated the eventual separation of the recovered crude phenols from the tricresyl-solvent may be effected by vacuum distillation in the known manner. The crude phenols in question comprise approximately one-fifth carbolic acid, the remainder being mainly ortho and para cresol and some higher homologues. These are subject to refining and separation in the known manner.

A simplified method of treating the products previously referred to and indicated in Fig. 1, as "A", "B" and "C" may be effected by combining the steps of carbonation and solvent extraction, in such a manner as to promote the absorption of the phenol as it is released from the sodium phenolate solution by the reaction of the latter with the $CO_2$ gas brought into contact with it. Such a combination may be readily practiced by introducing the solvent, tricresylphosphate for example, simultaneously with the phenolate solution as shown in Fig. 2.

Figure 2:
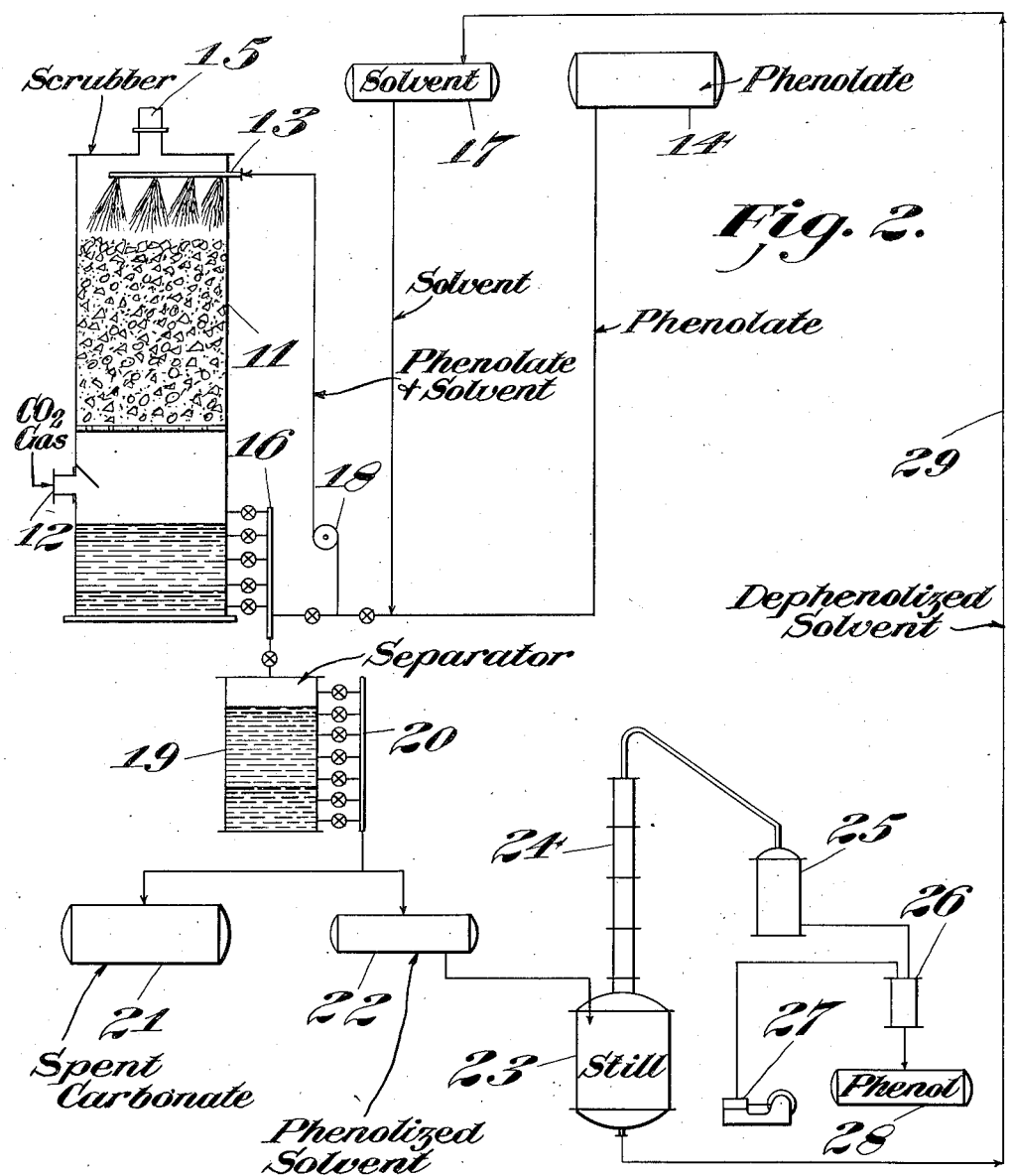

In Fig. 2 is shown a coke packed carbonating tower 11 of the usual type, having $CO_2$ gas inlet 12, a spray 13 for sodium phenolate solution, said solution being fed from phenolate feed tank 14; an outlet 15 for spent carbonation gas is also provided. The lower section of tower 11 forms a receiver for liquors and is provided with a decanting manifold 16 to permit separate removal of spent alkaline liquor and phenol enriched solvent. Said solvent, which by way of illustration may be tricresylphosphate, is derived from solvent storage tank 17, to which spray 13 is connected by suitable piping. A pump 18 is shown for feeding fresh sodium phenolate and solvent to the spray 13 or for recycling thereto partly spent liquor and/or partly phenolized solvent from the base of the tower, through manifold 16.

A decanting separator 19 is provided to receive the discharge of the spent alkali and phenolized solvent liquors, when these have reached a predetermined concentration. These liquors may be run to their appropriate receiving or storage tanks 21 and 22 through the decanting manifold 20 of the separator 19. Tank 21, for spent alkali, may be piped to a recausticizing plant or to waste. Tank 22, for phenolized solvent, is piped to a redistillation plant for separating the phenol from the solvent. The specific type of distillation plant will depend on the character of the solvent used. In the case of tricresylphosphate, the preferred solvent for the purpose in view, the distillation plant comprises a steam heated vacuum still 23 and column 24, a condenser 25, a separator and vacuum break 26, vacuum pump 27 and crude phenol receiver 28, all of a type well known in the art. Suitable piping, shown by an arrowed flow line 29, is provided for discharging the residual dephenolized tricresylphosphate from the still 23 to solvent storage tank 17, whence it may be recycled to the carbonating tower 11.

In this preferred method of operation, the sodium phenolate solution, derived from the usual dephenolizer (indicated in the flow sheet of Fig. 1) and stored in the phenolate feed tank 14 of Fig. 2, is sprayed into the carbonating tower 11. Combustion gas or other gas containing $CO_2$ is introduced in the lower section of the carbonator in the usual manner. Tricresylphosphate, or other suitable solvent, is also introduced into the carbonator concurrently with the sodium phenolate solution. Both phenolate and solvent pass down the tower countercurrently to the upward flow of carbon dioxide gas, with the result that the solvent absorbs the phenol set free by the reaction of carbon dioxide with sodium phenolate to form sodium carbonates, the phenolized solvent and the spent alkali carbonate solutions collecting in the receiving space below the gas inlet 12 of the carbonator. Depending on the comparative gravities of these two liquids, a preliminary separation into two layers takes place. The phenol-enriched solvent may be withdrawn and recycled back to the tower by suitable manipulation of the valves of the manifold 16 and recycled back to the tower through the pump 18, until the desired concentration of phenol in the solvent has been attained. The liquids at the base of the carbonator may be discharged to the separator 19, thence to their respective receiving tanks 21 and 22. The subsequent distillation of the phenolized solvent for separation therefrom of crude phenol, is in accordance with current practice; the dephenolized solvent being eventually returned to the system, through pipe 29, tank 17 and spray 13, concurrently with fresh phenolate solution.

The point of entry of solvent into the carbonating tower is for simplification here shown through the phenolate spray 13. It will be obvious to one skilled in the art, that a bell-capped plate column may be substituted for the coke packed tower shown in Fig. 2, and that the solvent, partly as fresh solvent and partly as recycled solvent in process of phenol enrichment, may be introduced at different levels of such a column. These and similar variations of method known to absorber practice are considered to be within the spirit of the invention. It is also evident that though tricresylphosphate is the solvent preferred for this process, because of its high absorptive capacity for phenol, other known solvents may be similarly used for the treatment of phenolate solutions.

I claim:

1. A process for treating alkali metal phenolate solutions, derived from ammonia still liquors, which consists in, carbonating the phenolate solution, effecting a gravity separation of the phenol liquors from the aqueous solution of alkaline carbonates and entrained phenols, treating said separated products and the spent gas of carbonation with a water insoluble solvent having high affinity for phenol, separating the phenolized solvent from the aqueous carbonate solution by decantation and dephenolizing the solvent by distillation.

2. A process for treating alkali metal phenolate solutions, derived from ammonia still liquors, which consists in, carbonating the phenolate solution, effecting a gravity separation of the phenol liquors from the aqueous solution of alkaline carbonates and entrained phenols, treating said separated products and the spent gas of carbonation with tricresylphosphate, separating the phenolized tricresylphosphate from the aqueous carbonate solution by decantation and dephenolizing the tricresylphosphate by distillation.

3. A process for treating alkali metal phenolate solutions derived from ammonia still liquors, which consists in, bringing the phenolate solution and a solvent having high affinity for phenols into intimate contact with gas containing carbon dioxide, whereby the solvent may absorb the phenol released by the reaction of the carbon dioxide with the alkali metal radicle of the phenolate, separating the phenolized solvent from the spent alkali metal carbonate solution and distilling the phenolized solvent to recover phenol.

4. A process for treating alkali metal phenolate solutions derived from ammonia still liquors, which consists in, bringing the phenolate solution and a solvent having high affinity for phenols into intimate contact with gas containing carbon dioxide, whereby the solvent may absorb the free phenol from the carbonated liquor and the phenol entrained with the spent gas of carbonation, separating the phenolized solvent from the spent alkali metal carbonate solution and distilling the phenolized solvent to recover phenol.

5. A process for treating phenolate solutions, which consists in, spraying the phenolate solution down a scrubbing tower countercurrently with a rising stream of carbon dioxide gas, introducing a phenol absorbing solvent into the tower concurrently with the phenolate solution, separating the phenolized solvent from the spent carbonated liquor and recovering phenol by the distillation of the phenolized solvent.

6. A process for treating alkali metal phenolate solutions, derived from ammonia still liquors, which consists in, carbonating the phenolate solution to release the phenol radicle thereof, absorbing the latter in a water-insoluble liquid having a high solvent power for phenol and distilling crude phenol from the solvent in which it has been absorbed.

BENJAMIN W. WINSHIP.